C. C. EARNIST.
TRANSMISSION GEARING.
APPLICATION FILED OCT. 9, 1911.

1,036,981.

Patented Aug. 27, 1912.
3 SHEETS—SHEET 2.

WITNESSES:
Thos W Riley
M. Newcomb

INVENTOR
C. C. Earnist
BY W. J. FitzGerald
Attorneys

C. C. EARNIST.
TRANSMISSION GEARING.
APPLICATION FILED OCT. 9, 1911.
1,036,981.
Patented Aug. 27, 1912.
3 SHEETS—SHEET 3.
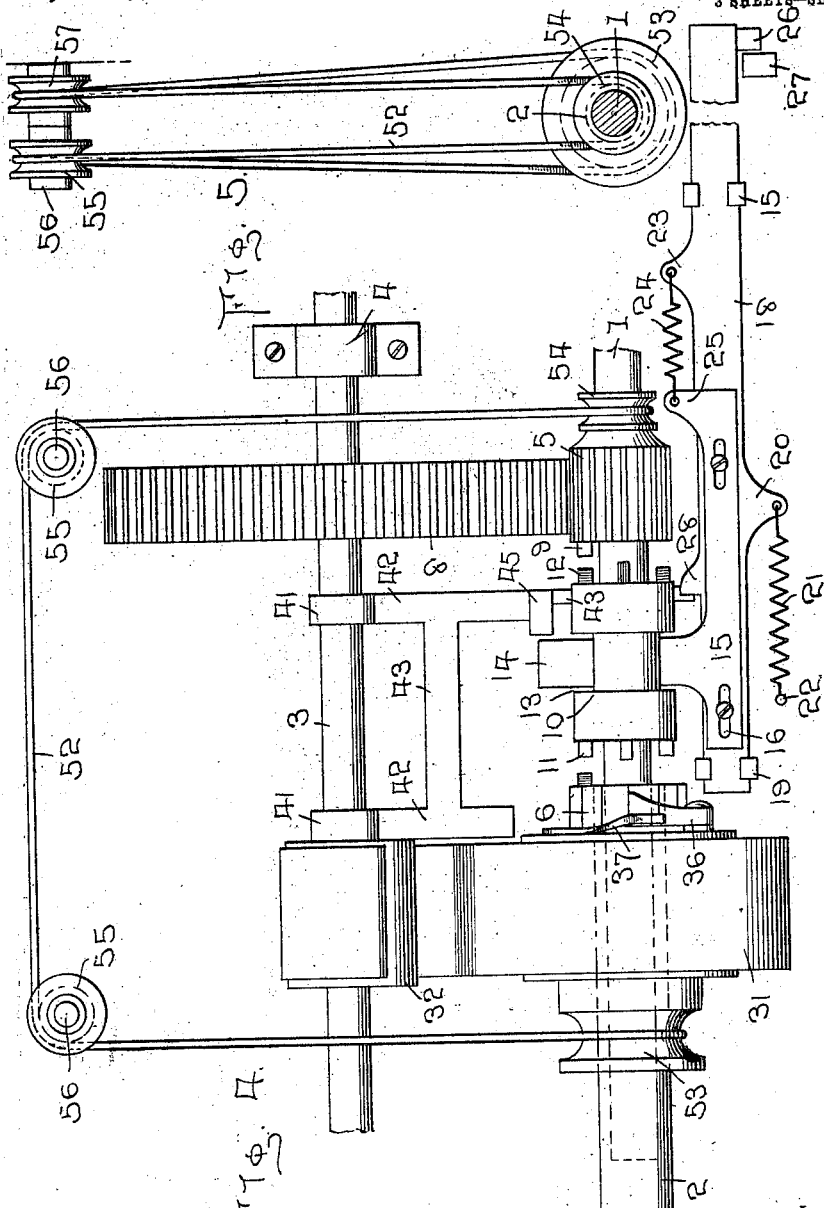
WITNESSES:
Thos. W. Riley
M. Newcomb
INVENTOR
C. C. Earnist
BY W. J. FitzGerald
Attorneys

UNITED STATES PATENT OFFICE.

CYRUS C. EARNIST, OF RICEVILLE, IOWA.

TRANSMISSION-GEARING.

1,036,981.  Specification of Letters Patent.  Patented Aug. 27, 1912.

Application filed October 9, 1911. Serial No. 653,578.

*To all whom it may concern:*

Be it known that I, CYRUS C. EARNIST, citizen of the United States, residing at Riceville, in the county of Mitchell and State of Iowa, have invented certain new and useful Improvements in Transmission-Gearing; and I do hereby declare the following to be a full, clear, and exact description of the invention, such as will enable others skilled in the art to which it appertains to make and use the same.

This invention relates to transmission gearing and is particularly adapted to transmit power from one rotating shaft to a second shaft to start the latter and couple the same to the first shaft after the second shaft has started to rotate.

An object of the invention is to provide transmission gearing of this character to be used when starting machinery, particularly motor propelled vehicles.

Another object is to provide mechanism at the meeting ends of two shafts which may be employed for transmitting rotary motion from the rotating shaft to the other shaft and gradually starting the latter until the same is rotating at about the same rate of speed as the first shaft, at which time the mechanism will automatically lock the shafts together to produce a direct drive.

Another object is to provide mechanism of this character which may be readily employed upon the drive shaft of a motor vehicle for starting the motor vehicle slowly and gradually increasing the speed thereof without any unevenness or undue strain upon the parts of the machinery.

Another object is to provide transmission gearing of this character which may be brought into operation by the movement of the clutch lever as the latter is thrown to bring the clutch into play.

Other objects and advantages will be hereinafter set forth and pointed out in the specification and claims.

Figure 1:
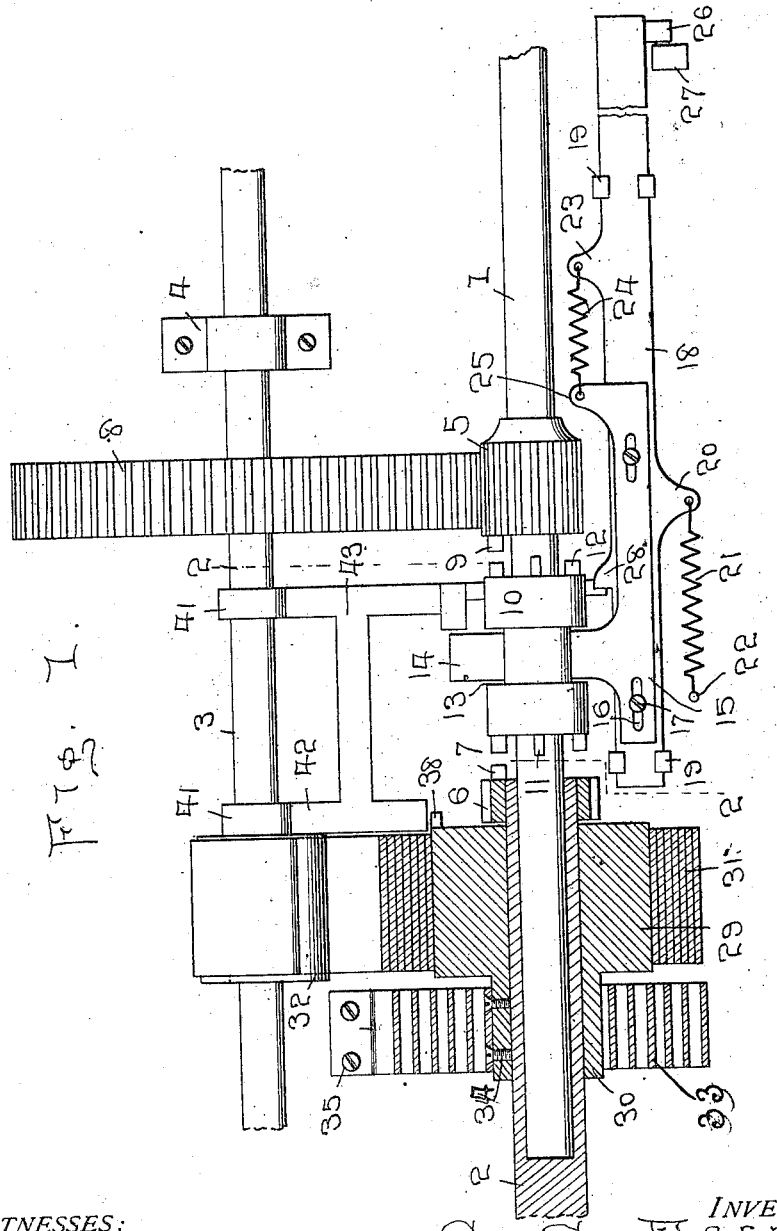
Figure 2:
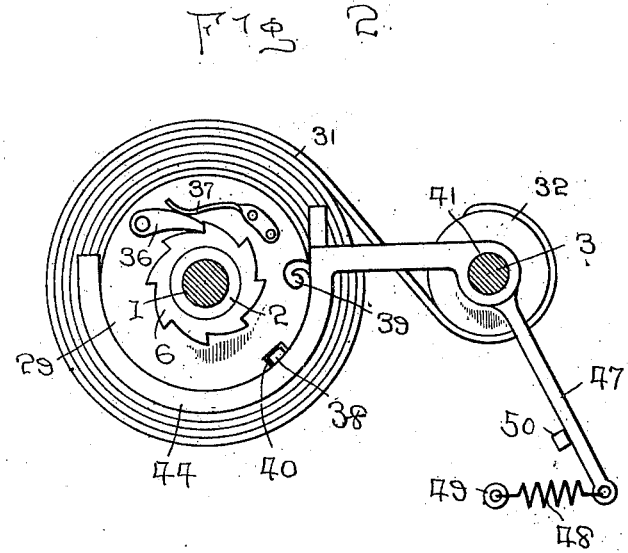
Figure 3:
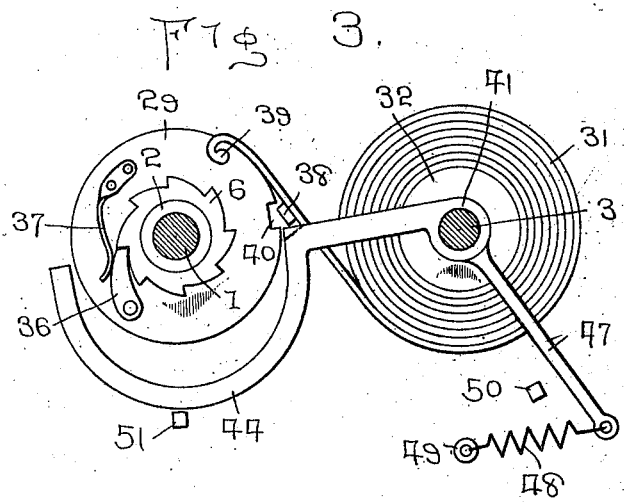

In the accompanying drawings which are made a part of this application, Figure 1, is a plan view, parts being shown in section, Fig. 2, is a sectional view on the line 2—2, Fig. 1 showing the spring wound upon the drum 2 carried by the second shaft, Fig. 3, is a view similar to Fig. 2, the spring being wound upon the small drum on the auxiliary shaft, and the trip lever in its downward position, Fig. 4, is a diagrammatic view, showing a modified form of spring re- winding means, and Fig. 5, is an end view of the spring re-winding means shown in Fig. 4.

Referring more particularly to the drawings in which similar reference numerals designate corresponding parts throughout the several views, 1 represents the first shaft or the shaft connected with the engine (not shown) and 2 the second shaft which connects with the driven shaft (not shown) of a motor vehicle or other machinery, the end of the shaft 1 preferably rotating within the adjacent end of the shaft 2, the two shafts, thus connected forming the drive shaft of the machine. An auxiliary shaft 3 extends practically parallel with the shaft 1 and 2 and may be supported within suitable brackets 4 carried by the framework or stationary supports (not shown).

Mounted for free rotation upon the shaft 1 is the gear wheel 5 which is keyed or otherwise suitably held against longitudinal movement upon said shaft 1, adjacent the end of the shaft 2. Upon the end of the shaft 2, working over or fitting around the end of the shaft 1 is the ratchet wheel 6 having the teeth 7 upon its face toward the gear wheel 5. The ratchet wheel 6 is rigid with the shaft 2 and is provided with suitable ratchet teeth upon its periphery, the purpose of which will presently appear. The gear wheel 5 which is continually in mesh with the large gear wheel 8 rigid upon the auxiliary shaft 3, carries the teeth 9 upon its face toward the teeth 7 on the ratchet wheel 6. Between the ratchet wheel 6 and the gear wheel 5 and mounted for slidable movement upon the shaft 1, is the double headed clutch member 10 having the teeth 11 upon the face of one head for engagement with the teeth 7 and the teeth 12 upon one face of its opposite head for engagement with the teeth 9 carried by the gear wheel 5. The double headed clutch member 10 has its head divided by the circumferential groove 13 around the central portion thereof within which groove is engaged the collar 14 integral with the slide bar 15. The slide bar 15 is provided with suitable slots 16 through which are positioned the screws 17, the heads of which are upon one face of the bar 15 while the points thereof are engaged within the lower slide bar 18 which latter slides within the guides 19. The slide bar 18 has a depending perforated ear 20 within the perforation of which is secured one end of the coil spring 21 while the opposite end thereof is secured to a pin 22 carried by the framework or a stationary support. A similar ear 23 extends from the opposite side of the bar 18, nearer the forward end thereof and has one end of the coil spring 24 secured therein while the opposite end of the spring is secured within the perforated ear 25 projecting through one side from the forward end of the slide bar 15, thus resiliently connecting the slide bars 15 and 18. Projecting from the first side of the slide bar 18, adjacent the forward end, is the projection or lug 26 against which operates the clutch lever 27 to force said bar forwardly as the clutch is thrown into operation. Projecting from the opposite side of the slide bar 18, between the ear 23 and the rear end of the bar is the latch lug 28, the purpose of which will presently appear. When the slidable parts are in neutral position the double headed slide clutch member 10 is between the ratchet wheel 6 and the gear wheel 5 and is not in engagement with either of these wheels, as will be clearly seen by referring to Fig. 1 of the drawings.

Loosely mounted upon the shaft 2, adjacent the ratchet wheel 6 is the pulley 29 having the reduced extension 30. Secured by one end to the pulley 29 is the belt 31 which has its opposite end secured to the small pulley or roller 32 which is rigid with the auxiliary shaft 3. The belt 31 is of such length as to allow the same to be wound a number of times around either pulley. One end of a strong spring 33 is secured by means of suitable screws 34 to the extension 30 of the loose pulley 29, while the opposite end of the spring is fastened by suitable screws or other securing means 35 to the framework or stationary support (not shown). The spring 33 normally tends to wind the belt 31 upon the large pulley 29 and as the pulley 29 is loose upon the shaft 2, the rotation of the latter will not have any effect upon the belt 31 or pulley 29 upon which it is wound. The pulley 29 carries upon one face the dog 36 which is normally held in engagement with the teeth of the ratchet wheel 6 by means of the curved leaf spring 37 which is also secured to the face of the pulley 29. As the pulley 29 is caused to rotate to allow the belt 31 to unwind therefrom and wind on to the pulley 32, the shaft 2 will be caused to rotate by the dog 36 engaging the ratchet wheel 6 and rotating the latter. A suitable lug 38 is carried by the belt 31 near the end 39 thereof secured to the pulley 29 and said lug normally rests within a recess 40 provided therefor in the periphery of the pulley 29.

Loosely mounted around the auxiliary shaft 3 are the collars 41 which are integral with the straight arms 42 connected by cross rod 43 to form the main portion of the trip lever. One of the arms 42 is extended beyond the cross arm 43, which latter is parallel with the auxiliary shaft 3. The extended arm 42 is adapted for engagement by the lug 38 immediately after said lug leaves its recess 40 as the operation of unwinding the belt 31 from the pulley 29 and on to the small pulley 32 is nearly completed, to swing the trip lever downwardly. The other arm 42 is also extended beyond the cross arm 43 and for a greater distance than the first arm. The second extended arm 42 is then curved into substantially semi-circular form to produce the latching arm 44 which is adapted to latch the lower slide bar 18 in its forward position. This arm also has a stop extension 45 at the junction of the extended semi-circularly curved portion 44 thereof with the end of the straight or main portion of said arm. The extension 45 has a beveled face and is adapted to stop or limit the movement of the collar 14 and thus prevent engagement of the teeth 12 with the teeth 9 except when it is desired to transmit power through the slidable clutch member 10 and the gear wheel 5 to the shaft 3 by means of the gear wheel 8 to wind the belt 31 upon the small pulley 32.

Directed at an angle from one of the collars 41 is a downwardly directed handle 47 which has one end of a controlling spring 48 connected therewith while the opposite end of the spring is secured as shown at 49 to any suitable stationary object such as a part of the framework. The handle 47 is limited in its movement downwardly by means of the stop 50 and the movement of the trip lever is limited in the downward direction by means of the stop 51 against which the under curved face of the curved portion 44 of said lever is adapted for engagement. The trip lever, is adapted to be tripped by the lug 38, previously mentioned and the lever controls the movement of the slide bars 15 and 18 and of the slidable clutch member 10 and locks them in their forward positions.

In Figs. 4 and 5 I have shown an endless cord and a series of pulleys which may be substituted for the flange 30 and spring 33 to rewind the belt 31 on to the pulley 29. The endless cord 52 passes over or around the pulley 53 which is integral with the large belt pulley 29 and takes the place of the flange 30. Before reaching the pulley 53, however, the endless cord 52 passes around the pulley 54 which is rigid upon the first shaft 1 and over the small pulleys 55 which are spaced from one another on suitable shafts 56 and these pulleys 55 act as guide pulleys to guide the cord 52 from the pulley 54 to the pulley 53, making it possible for the cord 52 to avoid the gear wheels, etc. After passing around the pulley 53, the cord 52 travels over guide pulleys 57 opposite the guide pulleys 55 and upon the same shafts which are preferably double shafts or divided shafts to allow the pulleys 55 and 57 to rotate in opposite directions. The shafts 56 may be mounted for rotation upon any suitable part of a framework or stationary support, or, if preferred, the shafts 56 may be stationary and the pulleys 55 and 57 mounted thereon, for independent rotation.

When the device is to be employed upon a motor vehicle the drive shaft is divided and one end of the divided portion hollowed out to receive the reduced end of the other portion to form the shafts 1 and 2, as illustrated. The gears and pulleys are then arranged in accordance with the showing on the drawings, it being understood that an auxiliary shaft 3 is placed parallel to the shafts 1 and 2. After the engine has been started and the engine shaft has started to rotate, the clutch is thrown in by operating the clutch lever 27 which pulls forwardly upon the lug 26, causing the lower bar 18 to move forwardly, stretching the spring 24 and drawing the latch lug 28 from its position above the free end of the curved portion 44 of the trip lever. As soon as the latch lug 28 moves forwardly of the curved portion 44 of the trip lever arm, the trip lever is moved upwardly by means of its controlling spring 48, the free end of the curved arm assuming a position immediately back of the latch lug 28, preventing backward movement of the slide bar 18, thus locking it in its forward position. The spring 24, being twice the strength of the spring 21 will draw the upper bar 15 forwardly, said bar sliding on the screws 17 and the slot 16 serving to guide the bar 15 in a straight forward direction. As the collar 14 is integral with the slide bar 15 and fits within the circumferential groove 13 of the double headed clutch 10, the latter is caused to move forwardly upon the shaft 1 which, it will be understood, is rotating. The teeth 12 will be drawn against the face of the loose gear wheel 5 and said teeth 12 will lock with the teeth 9 and cause the small gear wheel 5 to rotate with the shaft 1 and the slidable clutch member 10. As the small gear wheel 5 is in mesh with the large gear wheel 8 on the auxiliary shaft 3 said shaft is caused to revolve at a lower speed than the shaft 1. As the shaft 3 revolves, the small rigid pulley 32 will draw the belt 31 from the loose pulley 29 and wind the same on to the pulley 32. The dog 36, carried by the loose pulley 29 being in engagement with the teeth of the ratchet wheel 6 will rotate the shaft 2. As the pulley 32 is small in diameter and the loose pulley 29, with the belt 31 wound thereon is of much greater diameter, the shaft 2 will be caused to rotate very slowly at first and during the decreasing in diameter of the pulley 29 and belt 31 thereupon and the increasing in diameter of the pulley 32 with the belt winding thereupon, the speed of the shaft 2 will be gradually increased until said shaft is revolving at the same rate of speed as shaft 1. About the time that the speeds of the shafts 1 and 2 are equal, the belt 31 is nearly unwound to its limit and the lug 38 will leave its recess 40 and engage the extended end of the straight arm 42 and press or force the trip lever downwardly against the tension of its controlling spring 48. This will allow the spring 21 to come into operation and draw the slide bars 15 and 18 rearwardly, disengaging the double headed slidable clutch member 10 from the gear 5 and engaging the same with the ratchet wheel 6, locking the shafts 1 and 2 for rotation together, thus producing a direct drive from shaft 1 to shaft 2. The auxiliary shaft 3 will cease rotating and the belt rewinding spring 33, which was wound during the unwinding of the belt 31 from the pulley 29, will act upon the pulley 29 to rotate the same in the opposite direction and rewind the belt 31 upon the same. During the rewinding of the belt 31 upon the pulley 29 and the rotation of the shaft 2 with the shaft 1 after the rewinding of the belt 31, the teeth of the ratchet wheel 6 will simply ride beneath the dog 36. When the continuous cord 52 is employed for re-winding the belt 31, said cord will slip over the pulley 53 during the unwinding of the belt 31 from the pulley 29 and the winding of the belt on to the pulley 32. The continuous cord 52 will, however, readily rotate the pulley 53, upon the disengagement of the slidable clutch member 10 from the gear wheel 5 and the engagement of said clutch member with the ratchet wheel 6, and thus readily rewind the belt 31 on to the pulley 29. The cord 52 will also slip over the pulley 53 and slide therearound after the belt 31 has been rewound upon the pulley 29 and will tend to prevent said belt from becoming loose, during the rotation of shaft 2 with shaft 1.

It will thus be seen that I have provided a device of this character which will transmit power from a rotating shaft to a shaft in alinement therewith and start the second shaft at a low rate of speed, gradually increasing the speed of this shaft until it equals that at which the shaft is rotated, after which it is automatically locked with the first shaft to produce a direct drive, without any jar or unevenness or any undue strain upon the parts of the machinery.

Should this mechanism be employed upon a motor vehicle, it will be evident that the same may be started at slow speed, the vehicle moving slowly at first without having to start on low gear and changing suddenly from one gear to another as has heretofore been necessary, said changing causing the jerky movement of the machine and undue strain upon the parts of the mechanism.

It will be clearly apparent, however, that this gearing may be employed upon various types of machinery, both movable and stationary and will be highly efficient, durable and effective in the performance of its duties.

What I claim is:

1. A rotary shaft, a second rotary shaft, means for transmitting power from the first shaft to the second shaft to start the same slowly and gradually increase the speed of rotation thereof automatically and finally lock the shafts together.

2. A rotary shaft, a second shaft in alinement with the first shaft, and means for transmitting power from the first shaft to the second shaft to start the same at a rate of speed below that at which the first shaft is rotating and gradually increase the speed of rotation of the second shaft automatically to the speed of the first shaft.

3. A rotating shaft, a second shaft in alinement with the first shaft and adapted to be rotated thereby, means for transmitting power from the first shaft to the second shaft and gradually increasing the speed of rotation thereof automatically and locking the shafts for rotation together.

4. A transmission gearing comprising a driving shaft, a second shaft, an auxiliary shaft, connections between the driving shaft and the auxiliary shaft, connections between the auxiliary shaft and the second shaft to start the latter to rotate when said connections are in operative relation, means to place the connections in operative relation, means for automatically locking the first and second shafts for rotation together after the latter has been started to rotate, and means for automatically returning the auxiliary shaft and the connections to their former positions.

5. A transmission gearing comprising a driving shaft, a second shaft, an auxiliary shaft, connections between the driving shaft and the auxiliary shaft, connections between the auxiliary shaft and the second shaft to start the latter to rotate when said connections are in operative relation, means to place the connections in operative relation, means for automatically locking the first and second shafts for rotation together after the latter has been started to rotate, and resilient means for returning the auxiliary shaft and the connections to their initial positions after the first and second shafts have been locked together.

6. A driving shaft, a driven shaft in alinement with the driving shaft, an auxiliary shaft spaced therefrom and parallel with the driving and the driven shafts, connections between the driving shaft and the auxiliary shaft, connections between the auxiliary shaft and the driven shaft, means to place the connections in operative relation to transmit power to the driven shaft and to start the same to rotating slowly and gradually increase the speed of rotation thereof, and means to lock the driven shaft with the driving shaft after the starting of rotation of the former.

7. A driving shaft, a driven shaft in alinement with the driving shaft, an auxiliary shaft parallel with the driving shaft and driven shaft, connections between the driving shaft and auxiliary shaft, connections between the auxiliary shaft and driven shaft to transmit power to the driven shaft and start the same to rotate slowly, the rotation of said driven shaft automatically increasing in speed until it equals that of the driving shaft, means to place the connections in operative relation to start the rotation of the driven shaft, means to lock the driving shaft with the driven shaft when the speed of the latter equals that of the former, and means for returning the connections to their initial positions after the locking of the driving shaft with the driven shaft.

In testimony whereof I have signed my name to this specification in the presence of two subscribing witnesses.

CYRUS C. EARNIST.

Witnesses:
R. A. CARPENTER,
M. J. SLOAN.